UNITED STATES PATENT OFFICE.

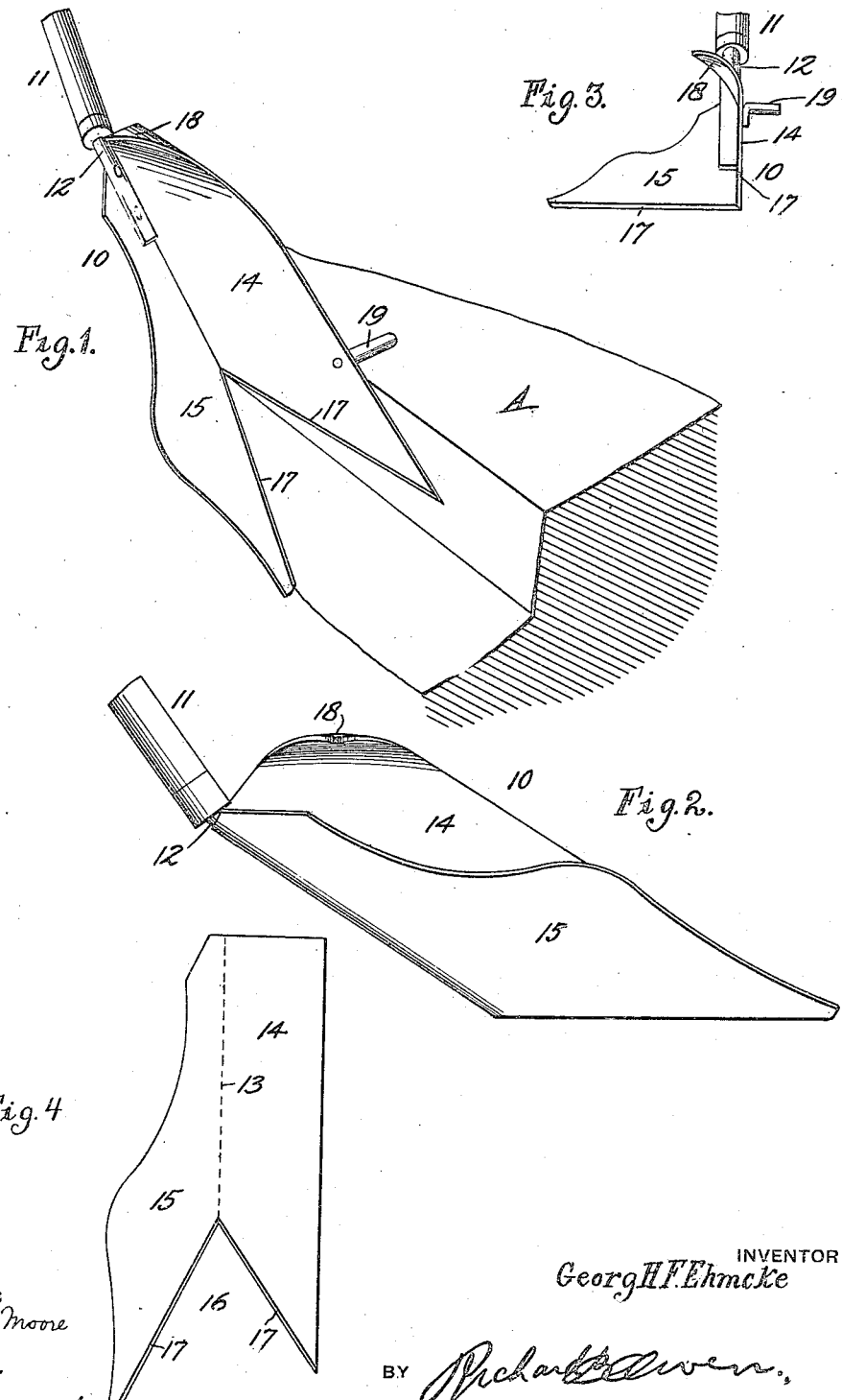

GEORG H. F. EHMCKE, OF FREMONT, NEBRASKA.

LAWN-TRIMMER.

1,252,675.  Specification of Letters Patent.  Patented Jan. 8, 1918.

Application filed September 7, 1916. Serial No. 118,878.

*To all whom it may concern:*

Be it known that I, GEORG H. F. EHMCKE, a citizen of the United States, residing at Fremont, in the county of Dodge and State of Nebraska, have invented certain new and useful Improvements in Lawn-Trimmers, of which the following is a specification.

This invention relates to lawn trimmers, and has for its object to provide a simple, convenient and unique device for trimming the edges of lawns, particularly adjacent a sidewalk, whereby all grass and weeds are removed at the edge of the sod and adjacent the sidewalk, and a neat and trim finish given the lawn.

The object of the invention is to provide an implement that is strong and light and easily handled, and which will remove all growth from the edge of the lawn and throw the same to one side where it may be easily gathered and carried away.

With the above and the principal object in view, the invention consists of the novel construction hereinafter described and illustrated in the accompanying drawing, in which—

Figure 1 is a perspective view of the implement in position for use,

Fig. 2 is a side view of the same,

Fig. 3 is a front view, and

Fig. 4 is a view of the blank from which the implement is made.

In the drawing, 10 indicates the head of the implement attached to a handle 11 by a shank 12 riveted to the head. The head is preferably made of sheet steel cut in the form shown in Fig. 4 and folded on the line 13 to bring two sides 14 and 15 at an angle to each other at about 60°. At its forward end the blank has a deep V-shaped notch 16, the edges 17 of which are sharpened for the purpose of cutting and scraping the weeds and grass from the edge of the sidewalk and the ground adjacent thereto. The side 14 of the implement at its upper end is folded inwardly as at 18 on a curve for the purpose of throwing the material cut by the implement and forced upwardly thereon to one side and away from the sidewalk which is indicated at A Fig. 1. On the outer side of the side 14 is riveted a finger 19 which is adapted to slide over the sidewalk and prevent the implement from being forced downwardly into the ground. The distance which the finger 19 holds the implement above the ground adjacent the sidewalk is such that the edge 17 of the side 15 will just slide over the upper surface of the ground and cut away all grass and weeds just above the ground.

In use the implement is placed against the edge of the sidewalk with the finger 19 on the top thereof and the side 14 standing vertically against the edge of the same. The side 15 has its cutting edge 17 extending substantially parallel to and even with the top of the ground, while the cutting edge 17 of the side 14 runs against the edge of the sidewalk. In this position the instrument is pushed forward and the cutting edges 17 remove all growth from the ground and clean thoroughly the edge of the sidewalk giving the same a neat and trim finish.

What is claimed is:

1. A lawn trimmer comprising a head formed of a plate of sheet metal bent longitudinally at an angle to form diverging sides, the forward edges of the sides diverging from the folds in the plate and sharpened to form cuttting edges, and the upper corner portion of one of said sides being folded inwardly to provide a deflector.

2. A lawn trimmer comprising a head having side plates extending in diverging relation and having forward cutting edges extending in diverging relation from the edges of the side plates, the upper corner portion of one of the side plates being folded inwardly to provide a deflector.

In testimony whereof I affix my signature in presence of two witnesses.

GEORG H. F. EHMCKE.

Witnesses:
 CARL A. SILAS,
 HENRY T. VELMER.